United States Patent [19]

Miller

[11] Patent Number: 5,794,916
[45] Date of Patent: Aug. 18, 1998

[54] HIGH PRESSURE FLUID VALVE SEALING APPARATUS

[75] Inventor: Robert F. Miller, Arcadia, Calif.

[73] Assignee: Vemco Corporation, San Dimas, Calif.

[21] Appl. No.: 846,135

[22] Filed: Apr. 25, 1997

[51] Int. Cl.$^6$ .................................................. F16K 51/00
[52] U.S. Cl. .................................................. 251/148
[58] Field of Search .................................... 251/148, 144; 137/613, 505, 505.42

[56] References Cited

U.S. PATENT DOCUMENTS

| | | | |
|---|---|---|---|
| 2,709,566 | 5/1955 | Davis | 251/148 |
| 4,744,387 | 5/1988 | Otteman | 137/505 X |
| 4,802,504 | 2/1989 | Politi | 137/505.42 X |

*Primary Examiner*—Kevin Lee
*Attorney, Agent, or Firm*—William W. Haefliger

[57] ABSTRACT

In a valve unit to control the flow of high-pressure fluid, the combination comprising a housing having a fluid inlet and a fluid outlet; a flow port in the housing communicating between the inlet and outlet; a control for controlling fluid flow through the flow port; tubular structure connected to the housing to receive fluid flowing through the outlet; the housing defining an annular shoulder bounding an annular recess at the outlet, and the tubular structure defining a tapered annular nose received in the recess, there being a thin metallic sealing washer clamped between the tapered annular shoulder and the nose; and the washer having a skirt carried by the tubular structure in washer aligning position relative to the nose.

10 Claims, 2 Drawing Sheets

HIGH PRESSURE FLUID VALVE SEALING APPARATUS

BACKGROUND OF THE INVENTION

This invention relates generally to valves adapted for use on high-pressure gas storage cylinders, to control delivery of gas from such cylinders or containers. More particularly, it concerns improvements in seals provided at the outlets from such valves.

There is need for improvements in the construction and operation of cylinder valves, especially as regards sealing established at the outlet ports from such valves, so that leaks may be prevented at such outlets.

Assured prevention of such leakage becomes acutely important where such gases are extremely toxic.

Desire has been expressed by members of the industry to develop a type of seal that would allow unions to be successfully re-made more times before one, or both, of the mating members have to be replaced. Replacing either of the members results in substantial cost being incurred as the system needs to be shut down, new fittings welded in place, purged, and then re-started. In the case of a cylinder valve, the entire valve needs to be replaced if the sealing surface becomes damaged. This results in not only the loss of the valve, but also in the loss of the cylinder lading.

SUMMARY OF THE INVENTION

It is a major object of the invention to provide improvements meeting the above referenced need. Basically, the invention is provided in a valve unit that includes:

a) a housing having a fluid inlet and a fluid outlet, b) a flow port in the housing communicating between the inlet and outlet, c) control means for controlling fluid flow through said flow port, d) tubular means connected to said housing to receive fluid flowing through said outlet, e) said housing defining a tapered annular shoulder bounding an annular recess at said outlet, and said tubular means defining an annular nose received in said recess, f) there being a thin metallic sealing washer clamped between said tapered annular shoulder and said nose, g) and said washer having a skirt carried by said tubular means in washer aligning position relative to said nose.

Another object is to provide the nose of the tubular means to have an annular surface angled to transmit compression loading via the washer to said housing tapered annular shoulder. Typically, the washer has a tapered annular section compressed between said nose annular surface and said tapered annular shoulder of the housing. As will be seen the nose is provided to be convex, as in a quarter-toroid configuration, toward the tapered annular section of the washer, for optimum sealing effect.

A further object includes provision of positioning ring structure, typically made of molded plastic, for positioning the washer skirt relative to the tubular means. Accordingly, the washer may be precisely axially and radially positioned at the time of clamping between the housing angled shoulder and the nose of the tubular means. Such ring structure may advantageously comprise inner and outer molded plastic rings at opposite sides of the washer skirt.

An additional object includes provision of a cap having an internal annular surface or shoulder urging said tubular means toward the housing to cause said nose to compressively and clampingly engage said washer.

In addition, the tubular means preferably defines an axis, as well as i) a cylindrical surface radially seating said inner ring, and a ii) radially extending surface axially seating said rings.

These and other objects and advantages of the invention, as well as the details of an illustrative embodiment, will be more fully understood from the following specification and drawings, in which:

DRAWING DESCRIPTION

DETAILED DESCRIPTION

Figure 1:
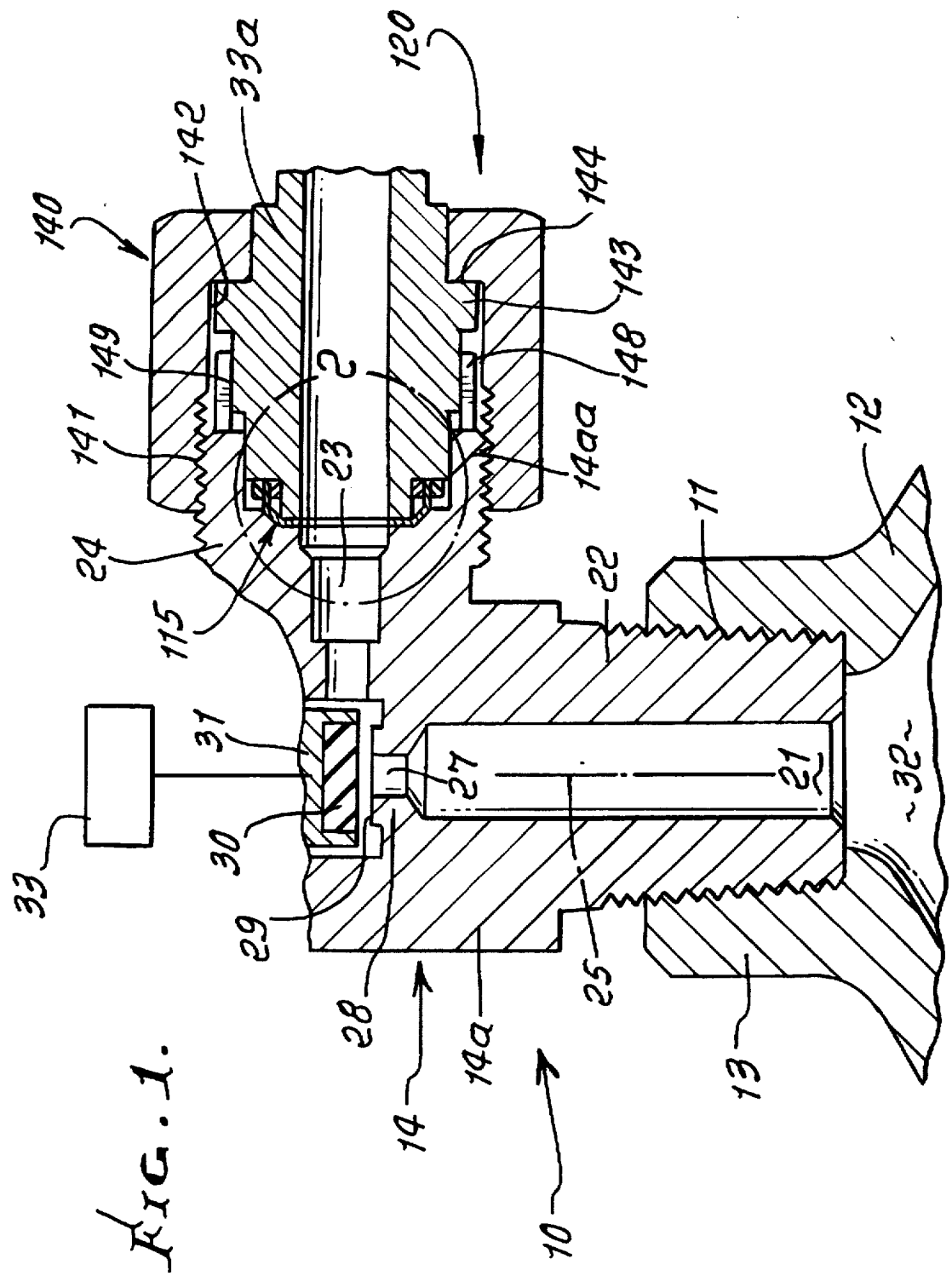
FIG. 1 is a vertical section taken through a valve unit, incorporating the invention.

The valve unit 10 shown in FIG. 1 is connected at 11 to a high-pressure gas (or other fluid) cylinder 12, as at upper neck 13 of the cylinder. The valve unit includes a metallic housing 14 that in turn may typically include a body 14a.

Merely as illustrative, the housing body has a pressurized fluid inlet 21 in body lower tubular extent 22, and a pressurized fluid outlet 23 in a body tubular sideward or transverse tubular extent 24. A body longitudinal axis appears at 25. A flow port is provided in the body, as at 27, through body transverse wall 28, and a valve seat is provided at 29 at the upper transversely flat side of wall 28. A seal or stopper 30, carried by a stem 31, is movable upwardly away from the seat and port 27 to open the valve unit, allowing flow from cylinder outlet 32 through 21, 27 and 23, to discharge piping 33a; and the seal or stopper is movable downwardly toward the port 27 to close against the seat, blocking fluid flow to 23. A valve stem actuator is shown at 33.

Seal or stopper 30 may consist of non-metallic material, such as an elastomer or plastic substance. Its diameter or width "w" is slightly greater than that of the upwardly protruding seat 29, to ensure tight closure. The stopper and seat may be circular about axis 25, as shown.

Figure 2:
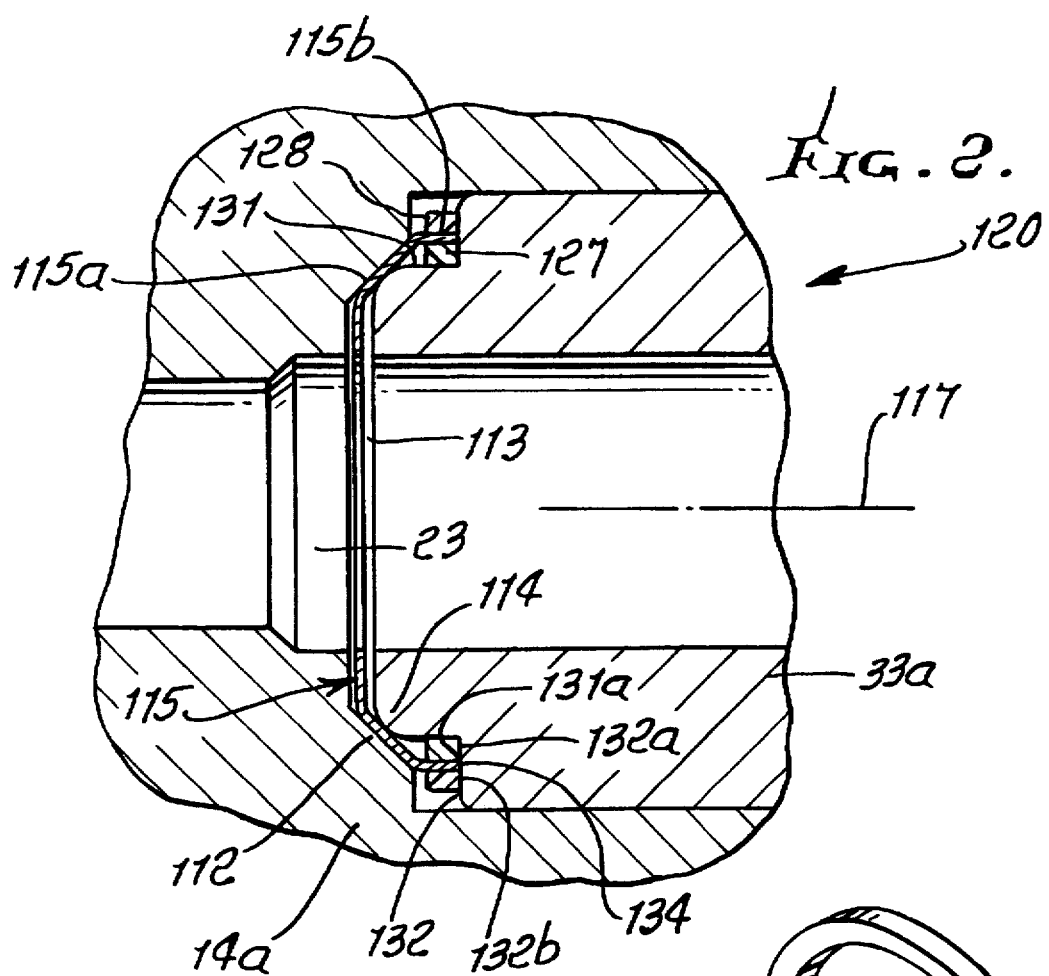
FIG. 2 is an enlarged vertical section taken on lines 2—2 of FIG. 1.
Figure 3:
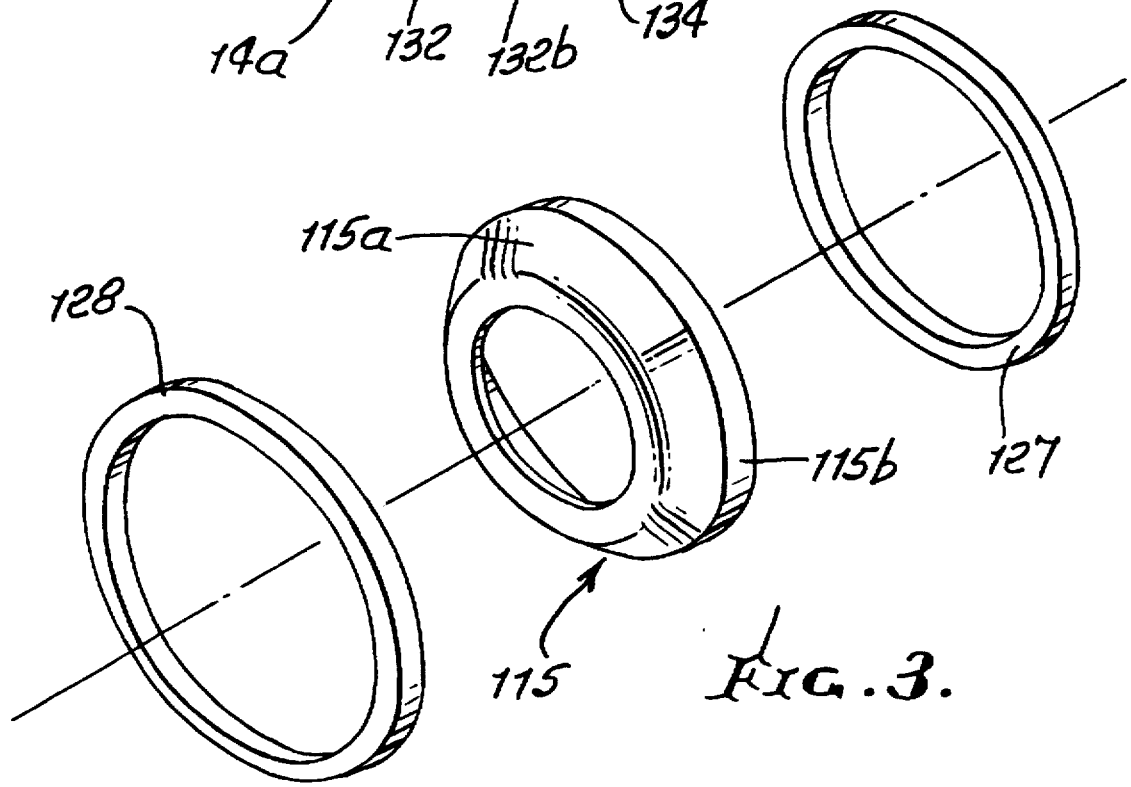
FIG. 3 is an exploded perspective view showing the washer and the ring structure that positions the washer skirt.

Extending the description to FIGS. 2 and 3, tubular means indicated at 120 is connected to the housing body 14a to receive fluid flowing through outlet 23. Such tubular means may be considered to include discharge piping 33a, as referred to above.

Further, the housing body 14a defines a tapered annular shoulder 112 bounding an annular recess 113 at the outlet. The tubular means 120 may be considered to define an annular nose received in the recess 113. See for example nose 114 at the leftward end of the piping 33a.

A thin metallic sealing washer, generally indicated at 115, is clamped between tapered annular shoulder 112 and the nose 114. See in this regard washer tapered annular wall extent 115a that is annularly clamped. Wall extent 115a may have the same or approximately the same conical taper angularity as shoulder 112, prior to clamping, and in this regard see FIG. 3. The washer may advantageously consist of nickel, to resist corrosion, and the valve body itself may consist of corrosion resistant alloy steel, or other material. Typical washer thickness may range between 0.003 and 0.006 inches.

The washer also has an annular skirt 115b, which extends cylindrically, or substantially cylindrically, about axis 117, the axis of the piping 33a. Skirt 115b is carried by the tubular means 120, as for example by piping 33a, in washer aligning position relative to the nose, as for example in coaxial relation with respect to the nose surface clamping the washer extent 115a. This is important to position the washer prior to its assembly with piping 33a to the housing body 14a.

In regard to the above, the nose has an annular surface angled to transmit compression loading via the washer to said housing tapered annular shoulder. Also, the washer has a tapered annular section compressed between said nose annular surface and said tapered annular shoulder of the housing. The nose is preferably convex toward shoulder 112, as well as toward the tapered annular section 115a of the washer.

As shown in the drawings, molded plastic ring structure is preferably provided, for positioning the washer skirt relative to the tubular means. In the example, such ring structure positions the washer skirt on and with respect to the leftward end extent of the piping 33a. Further, and as shown in the example, the ring structure preferably includes inner and outer molded plastic rings 127 and 128 at radially opposite sides of the washer skirt, the rings extending in coaxial relation with the skirt and piping 33a. The rings may advantageously consist of TEFLON, or equivalent corrosion resistant, durable material. Piping 33a has a cylindrical outer surface 131 radially seating the inner ring, at 131a; and piping 33a has a radially extending surface 132 facing leftwardly, and axially seating the two rings at 132a and 132b. The circular end 134 of the washer skirt also preferably seats at surface 132.

The tubular means 120 is also shown to include an annular cap 140 having threaded engagement at 141 with the annular projecting extent 14aa housing body 14a. The cap has a bore 142 receiving an annular flange 143 on 33a, and a shoulder 144 urging the tubular means piping 33a toward the housing body 14a, for causing the nose to compressively and clampingly engage the washer as described. Guide mans 148 on projection 14aa guidingly engages the cylindrical surface 149 on piping 33a, to guide the piping as it is leftwardly coaxially assembled to the housing.

In summary the half-toroidal shape currently being used is extremely subject to nicks and scratches on the area of the toroid that effects the seal, i.e., the very front face. The present invention moves the critical surface to the corner, utilizing a quarter-toroidal shape. Being on the corner, with a perpendicular surface close by, the sealing surface is placed out of harm's way for the majority of incidents that could cause damage. Also, the invention utilizes one quarter-toroid shape on said nose as opposed to two half toroid shapes on said housing and or said tubular means, further minimizing the chances for damage and therefore, leakage.

The sealing washer currently used is extremely thick as compared to the washer that is used in the present invention. The ability to use a thinner washer results from the increased compressive forces created by the quarter-toroid sectional shape being forced onto a conical abutment surface. The benefit from a thinner washer includes ability to transmit force to the conical abutment surface, instead of absorbing it. This results in a higher level of force applied to the seal, given a constant radial torque applied to the threaded members.

The elements employed by the invention are easily manufactured, and are effectively and easily refurbished, by light polishing, if the need arises after installation into a gas system.

I claim:

1. In a valve unit to control the flow of high-pressure fluid, comprising a) a housing having a fluid inlet and a fluid outlet, b) a flow port in the housing communicating between the inlet and outlet, c) control means for controlling fluid flow through said flow port, d) tubular means connected to said housing to receive fluid flowing through said outlet, e) said housing defining a tapered annular shoulder bounding an annular recess at said outlet, and said tubular means defining an annular nose received in said recess, f) a thin metallic sealing washer clamped between said tapered annular shoulder and said nose, g) and said washer having a skirt carried by said tubular means in a washer aligning position relative to said nose.

2. The valve unit of claim 1 wherein said nose has an annular surface angled to transmit compression loading via the washer to said housing tapered annular shoulder.

3. The valve unit of claim 2 wherein said washer has a tapered annular section compressed between said nose annular angled surface and said tapered annular shoulder of the housing.

4. The valve unit of claim 2 wherein said nose is convex toward said shoulder, and defines approximately a quarter-toroid.

5. The valve unit of claim 3 wherein said nose is convex toward said tapered annular section of the washer.

6. The valve unit of claim 1 including a molded plastic ring structure positioning said washer skirt relative to said tubular means.

7. The valve unit of claim 6 wherein said ring structure having inner and outer rings at opposite sides of said washer skirt.

8. The valve unit of claim 7 including a cap having threaded engagement with said housing, said cap having an internal annular surface urging said tubular means toward the housing to cause said nose to compressively and clampingly engage said washer.

9. The valve unit of claim 6 wherein said tubular means has positioning surfaces engaged by said ring structure.

10. The valve unit of claim 7 wherein said tubular means has an axis, and i) a cylindrical surface radially seating said inner ring, and ii) a radially extending surface axially seating said rings.

* * * * *